United States Patent
Olarig et al.

(10) Patent No.: US 6,886,109 B2
(45) Date of Patent: Apr. 26, 2005

(54) METHOD AND APPARATUS FOR EXPEDITING SYSTEM INITIALIZATION

(75) Inventors: Sompong P. Olarig, Pleasonton, CA (US); Michael F. Angelo, Houston, TX (US); Chai S. Heng, Santa Clara, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 09/860,266

(22) Filed: May 18, 2001

(65) Prior Publication Data

US 2002/0174381 A1 Nov. 21, 2002

(51) Int. Cl.⁷ .............................................. G06F 11/00
(52) U.S. Cl. ....................................... 714/25; 714/742
(58) Field of Search ............................. 714/25, 27, 26, 714/30, 31, 38, 39, 742, 735, 36, 37, 47, 43

(56) References Cited

U.S. PATENT DOCUMENTS

| | | | | |
|---|---|---|---|---|
| 4,634,110 A | * | 1/1987 | Julich et al. | 714/11 |
| 4,701,845 A | * | 10/1987 | Andreasen et al. | 714/31 |
| 4,841,437 A | * | 6/1989 | Lubarsky et al. | 714/712 |
| 5,276,864 A | * | 1/1994 | Hernandez et al. | 714/10 |
| 5,359,547 A | * | 10/1994 | Cummins et al. | 702/119 |
| 5,850,562 A | * | 12/1998 | Crump et al. | 713/1 |
| 6,289,472 B1 | * | 9/2001 | Antheunisse et al. | 714/25 |
| 6,496,945 B1 | * | 12/2002 | Cepulis et al. | 714/25 |
| 6,502,190 B1 | * | 12/2002 | Faver | 713/2 |

* cited by examiner

Primary Examiner—Nadeem Iqbal

(57) ABSTRACT

A computer system includes multiple controllers that assist in executing the Power-On Self Test (POST) sequence to minimize the time required to complete system initialization. By shifting some of the responsibilities for executing the POST sequence to other controllers within the system, the testing and initialization of system devices can proceed concurrently. The controllers interface with peripheral devices, and include a register set that includes command information for initializing the testing and initialization of associated peripherals. The register set also includes dedicated bits for indicating the status of testing and initialization cycles, which can be read by the CPU to determine if testing or initialization is in progress, if it has completed, and if any errors have occurred. The register set also includes a configuration register for indicating configuration information and operating parameters of the initialized drive or peripheral. By distributing the testing and initialization responsibilities to the controllers, execution of the BIOS system software or system initialization software can be expedited, thus minimizing down time caused by initializing the computer system.

36 Claims, 4 Drawing Sheets

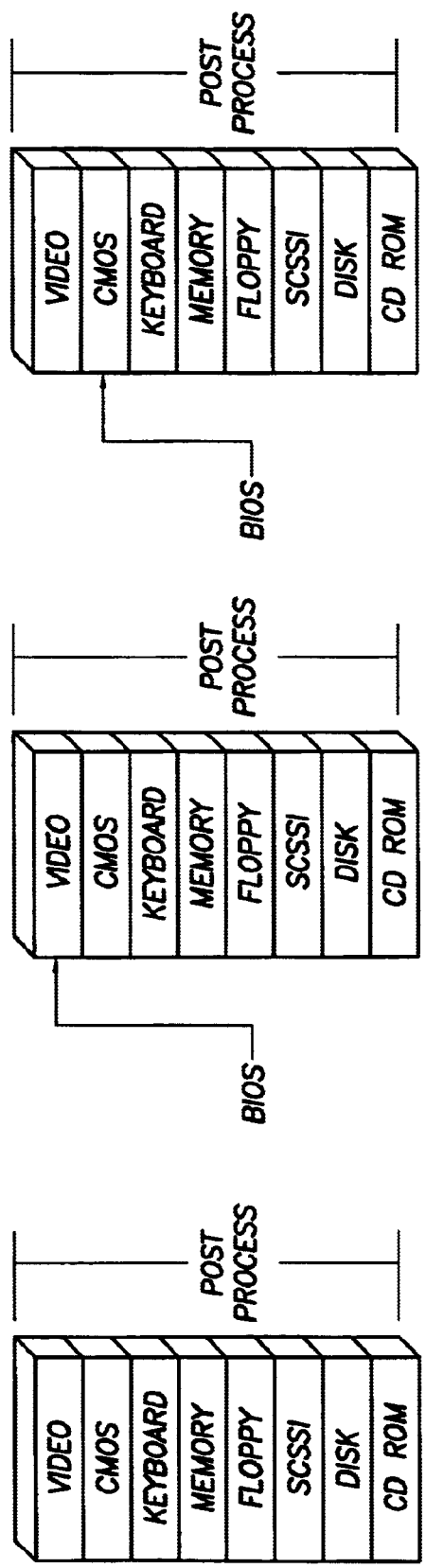

METHOD AND APPARATUS FOR EXPEDITING SYSTEM INITIALIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer systems that execute a power-on, self-test (POST) operation during system initialization to determine system capabilities and identify malfunctioning hardware. More particularly, the present invention relates to a computer system that expedites the system initialization process for processors in the system.

2. Background of the Invention

Conventional computer systems are designed to work with a wide variety of peripheral devices. These peripheral devices may be included in the computer system when it is originally manufactured, or may be added to the system by the consumer to expand the capabilities of the system. For successful operation, the computer system must be cognizant of these peripheral devices, and must provide the necessary electrical signals to these devices so that they can perform their intended function. Although these peripheral devices are considered hardware, they often include a microprocessor or some other programmable electronic device that enables these devices to operate intelligently, based on commands and instructions from a programmer.

At the heart of any computer system is the processor or processors that execute the software that controls system operation. Software for personal computers (PCs) and personal device assistants (PDAs) generally may be classified into two groups—the Basic Input/Output System (BIOS) of the computer system, and the Operating System (OS). The BIOS includes a series of complex software programs that are stored in a read-only memory (ROM) integrated circuit that is supplied as part of the basic computer system. The BIOS software provides at least three important functions in the operation of a computer system. First, the BIOS software includes routines for performing the Power-On Self Test (POST), which executes automatically each time the computer is powered. The POST routines check various components in the computer system, including memory, to identify hardware errors that may compromise the efficacy of the computer system. Users are unable to enter commands to the system during execution of the BIOS software. The second function performed by the BIOS software is to initiate device drivers. Device drivers are special programs that provide a set of standardized interfaces to the various hardware devices and peripherals in the system. The device drivers operate at the hardware level. This frees programmers from being required to understand the characteristics of the various hardware devices, and instead permits the programmer to program to a standard interface. Thirdly, the BIOS software provides a collection of useful services such as interrupts, that are primarily used by the Operating System as part of its normal operation.

One of the deficiencies of current computer systems is that it takes an excessive time to initialize the computer system. This is due in large measure to the amount of time it takes to execute the POST routines. The BIOS software, and in particular the POST routines, were designed early in the history of computer systems. Consequently, POST routines were written for computer systems that had relatively few hardware devices and peripherals. As hardware devices and peripherals have proliferated in computer systems, the execution of the POST routines has become increasingly lengthy. It is now fairly common for computer systems, such as PCs, servers, workstations and PDAs, to take several minutes to complete the boot cycle. The consequence is that users are forced to wait relatively long periods before gaining access to the computer system. For some users, the downtime experienced while a computer boots is an annoyance. For other customers, computer downtime translates into a loss of money, or increased exposure to risk. In some systems, any delay is unacceptable. One of the goals of modern computer systems, therefore, is to minimize the amount of time it takes to boot a computer or a processor. While some of these attempts have resulted in a shorter boot cycle, to appreciably reduce boot time for a computer system, it is necessary to minimize the delay that occurs during the execution of the POST software. To date, no one has attempted a major overhaul of the POST software to reduce system latency.

In systems with multiple processors, dynamic hardware partitioning may be used to enable the system to run multiple Operating Systems. In addition, dynamic hardware partitioning enables customers to swap components while the system is operational. Some of the components that may be hot swapped include processors, memory and various input/output (I/O) devices. In the event that processors are hot swapped, they must be booted before they can become operational. This means that the system must remain suspended while the newly added processor completes the boot process. Thus, the delay experienced by POST may be exaggerated in a multiple processor system that implements dynamic hardware partitioning. In addition, the BIOS software typically is executed when a new device is detected in a plug-and-play system. Thus, each time a new device is added to the system, the computer system may enter a cycle during which the computer system is inaccessible.

BIOS software operations typically are implemented in linear fashion. As an example, the conventional POST software operation is shown in FIGS. 1A–1D. Referring first to FIG. 1A, the POST process typically includes self-testing of eight different hardware groups, including video devices, CMOS memory and registers, keyboard, memory systems, floppy drives, SCSI devices, hard drives and CD-ROM drives. The BIOS executes linearly, as shown in FIGS. 1B–1D. Thus, as shown in FIG. 1B, the POST process begins by first testing video devices. Once the BIOS determines the operability of the video devices, the POST routine then tests the CMOS devices in the computer system, as shown in FIG. 1C. After this testing is completed, each of the other hardware component groups are tested sequentially in turn, until the CD-ROM drive is finally tested, as shown in FIG. 1D. Because of the linear nature of the BIOS software, the time to complete the POST process may be lengthy. This translates into a relatively long delay period in the operation of the computer system while the processor boots. If multiple processors are included in the computer system, this delay may be compounded.

Despite the apparent disadvantages presented by the current POST routine configuration, to date no one has developed an alternative arrangement that would minimize computer system boot times.

BRIEF SUMMARY OF THE INVENTION

The present invention solves the deficiencies of the prior art by reconfiguring the system initialization software to support concurrent testing and initialization of hardware resources. Conventionally, POST software executes serially, so that the system systematically initializes one hardware component at a time. Thus, for example, the self-testing of the memory system must complete before the testing of the floppy drive commences. By reconfiguring the POST software to perform multiple test operations concurrently, multiple hardware devices may be initialized and tested substantially simultaneously. Thus, for example, testing of the memory can overlap with testing of the floppy drive and the other system hardware components. The ability to have these operations overlap in time can substantially reduce system latency.

In accordance with a preferred embodiment of the present invention, the computer system includes intelligent controllers that interface with the peripheral devices. The controllers may be programmed to assist the processor in implementing the system initialization software. Thus, many of the testing and initializing operations that previously were performed by the CPU may be placed under the responsibility of various controllers. During the boot process, the BIOS software, executing on the CPU, initializes each of the controllers. The controllers then initiate test routines or discovery cycles for associated peripheral components. Once these test routines are complete, the controller either transmits a signal to the CPU, or else sets an appropriate status bit or bits in a register, which can then be read by the CPU as part of its execution of the BIOS software. After the test routines are completed, the controllers also may execute cycles to initiate their peripheral components. Once this initialization is complete, the controller again signals the CPU that this step has been completed. Any errors that are detected during the testing or initialization process may be reported to the CPU.

According to one aspect of the present invention, microprocessor-based controllers are provided in the computer system to interface with hardware components. Thus, for example, a memory controller interfaces with memory, while a floppy drive controller couples to and controls the operation of the floppy drive. These controllers may be integrated with the peripheral device, or may be configured as a separate interface coupled between the CPU and the peripheral device. In accordance with one aspect of the present invention, the controllers include the capability to both test and initialize the associated peripheral device. In addition, each controller includes registers for indicating the status of self-test and initialization operations, so that the CPU can check the status of these operations as part of executing its BIOS software. The controller also preferably includes register space for indicating the status of any errors that may arise during the self-test and initialization operation, which can be read by the CPU during execution of the BIOS or the Operating System.

These and other aspects of the present invention will become apparent upon studying the following detailed description, figures and claims.

BRIEF DESCRIPTION OF THE DRAWINGS

For a detailed description of the preferred embodiments of the invention, reference will now be made to the accompanying drawings in which:

FIGS. 1A–1D are diagrams illustrating the linear nature of prior art BIOS software;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device "couples" to a second device, that connection may be through a direct electrical connection, or through an indirect electrical connection via other devices and connections. To the extent that any term is not specially defined in this specification, the intent is that the term is to be given its plain and ordinary meaning. Furthermore, unless stated to the contrary in this document, the present invention does not intend to limit the location of devices in the computer system. Thus, for example, a controller may be physically located within a peripheral device, or may be positioned elsewhere in the computer system to couple the CPU to a peripheral device.

DETAILED DESCRIPTION OF THE PREFERRED EMBODIMENTS

Figure 2:
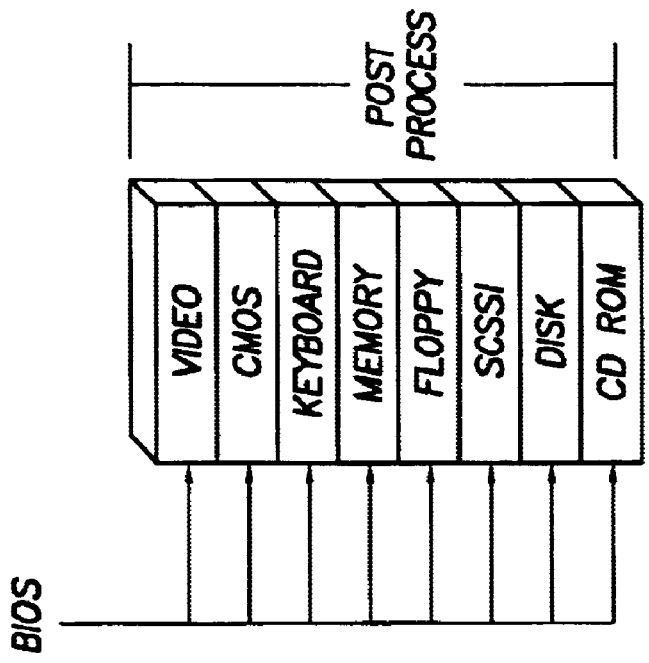
FIG. 2 is a diagram illustrating the parallel nature of the BIOS software, in accordance with the preferred embodiment of the present invention.
Figure 1D:
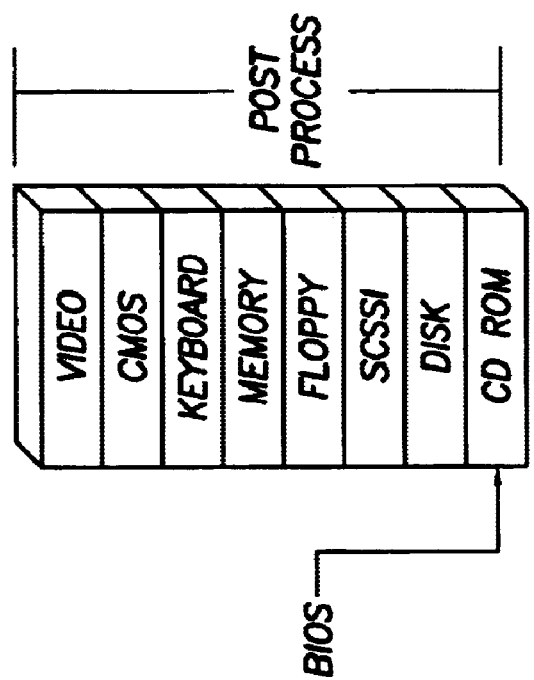

Referring initially to FIG. 2, the BIOS software preferably is configured to permit various routines in the POST process to execute concurrently. Thus, the BIOS software may begin multiple POST routines prior to the completion of any particular routine. This permits execution of the different POST routines to overlap in time, thereby minimizing the amount of time it takes to complete execution of the BIOS software. Thus, as an example, the BIOS software may begin execution of the video testing and initialization routines. Prior to the completion of those routines, the BIOS software may also begin the execution of the other POST routines shown in FIG. 2.

The ability to have multiple routines execute concurrently is achieved using a distributed processing architecture, in which various controllers in the system are responsible for executing different portions of the POST process. Thus, instead of having the responsibility for executing the POST routines reside solely in the CPU (or CPUs), controllers associated with each of the hardware devices share some of that responsibility. In many instances, the hardware devices already include a microprocessor-based controller that interfaces the hardware device to the CPU. One aspect of the present invention proposes adding some functionality to these controllers, to enable these controllers to assist in executing POST routines. To the extent that any hardware devices do not include a microprocessor-based controller, such a controller may be added, or an application specific integrated circuit (ASIC) may be designed to implement this functionality. As yet another alternative, the present invention may be implemented by only partially distributing responsibility for executing POST routines, so that hardware devices that include an appropriate controller are tested and initialized by their associated controller, while other devices are tested and initialized by the CPU. As an example, the memory controller and video controller may be programmed to execute POST routines relating to the memory and video devices, while the CPU performs the POST routines for all CMOS devices. This would permit at least some of the POST operations to proceed concurrently, and thus would also result in a quicker boot cycle. The following discussion describes the preferred embodiment of including controllers associated with each of the hardware devices, with the understanding that one or more of these controllers may be eliminated if desired and the functionality moved back to the CPU. In addition, although the controllers are shown as being fabricated as a separate device, it should be understood that the controller may be integrated with the hardware device. In addition, one or more of the controllers may be integrated together as part of the same semiconductor device to reduce cost and/or minimize space.

Figure 3:
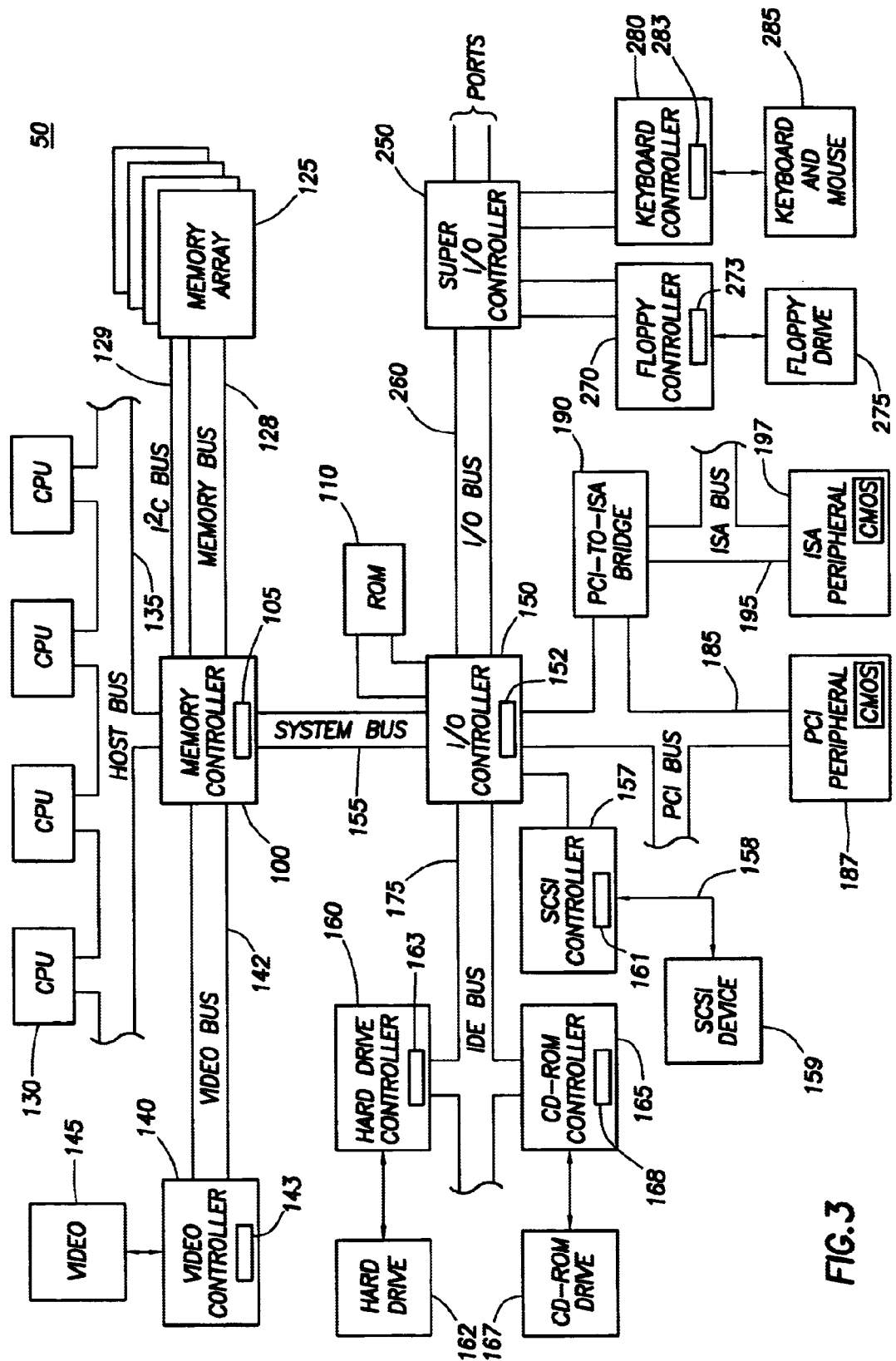
FIG. 3 is a block diagram illustrating an exemplary computer system capable of implementing the modified BIOS software of FIG. 2.

Referring now to FIG. 3, a computer system 50 constructed in accordance with the preferred embodiment may comprise a personal computer (PC), a web computer, a personal device assistant (PDA), a server, or a workstation, without limitation. Although not shown, the computer system 50 preferably couples via a suitable network connection to a local area network (LAN). As shown in FIG. 3, the computer system 50 preferably implements a standard computer architecture, including one or more CPUs (or processor) 130, system memory 125, a memory controller 100, a video controller 140, and I/O controller 150. In addition, a read only memory (ROM) 110 preferably is provided as part of the computer system 50. According to the preferred embodiment of FIG. 3, the ROM 110 couples to the I/O controller 150, but ROM 110 may be located elsewhere in the computer system, if so desired. The ROM 110 stores the BIOS software that is executed during the boot cycle of the CPU 130, and when devices are added to the system or interchanged with devices in the system.

The processors preferably couple to the memory controller 100 through host bus 135. Four such processors are shown in FIG. 3, one of which has been labeled as CPU 130 for convenience. According to the preferred embodiment, CPU 130 is responsible for executing the BIOS software. If desired, other processors may assist in executing the BIOS software. It should be understood that other embodiments of the invention may include a single processor or CPU coupled to the host bus. The processors may comprise any suitable microprocessor, such as the Pentium II®, Pentium III®, or Celeron® processor by Intel®, the Athlon® processor by AMD, the Alpha® processor from Compaq®, or other microprocessors from these or other manufacturers that may be used or configured for use in a computer system. The system memory 125 preferably comprises one or more memory devices such as any suitable type of random access memory. System memory may comprise, for example, synchronous dynamic random access memory (SDRAM), double data rate DRAM (DDR DRAM), Rambus Direct RDRAM, or other memory designs suitable for use in a computer. The capacity of the memory devices can be any suitable size. The memory devices may be arranged in arrays or channels that couple to the memory controller 100.

The memory controller 100 permits the processor 130 and other devices in computer system 50 to read data from or write data to system memory 125. Thus, the memory controller 100 coordinates data transactions to the memory 125 to support read and write cycles from any requesting device in the computer system. The memory controller 100 also supports control transactions from the CPU 130 to set control parameters in the memory. The memory controller 100 couples to the memory array 125 via a memory bus 128 that is specially configured to maximize the bandwidth between the memory controller and the memory array, while minimizing the number of pins required. In addition, the memory controller 100 may couple to each of the memory devices through a special purpose bus that is primarily used for control functions, such as detecting the presence of memory devices in the available memory slots. Although a separate bus is shown in FIG. 3, the functions of this bus may be integrated into the memory bus 128.

According to the preferred embodiment, the memory subsystem has its own dedicated Inter IC ($I^2C$) bus 129, thus enabling the memory controller 100 to engage in discovery operations independent of other $I^2C$ bus structures. Details regarding the $I^2C$ bus may be found in "The $I^2C$—Bus Specification, Version 2.1 (January 2000), authored by Philips Semiconductors®. Preferably, the memory controller 100 determines the size of each memory module or dual in-line memory module (DIMM) by reading the contents of the $I^2C$ interface in each memory module using either the special presence detect (SPD) protocol or other presence detect protocol.

During system power up or reset, the BIOS software stored in the system ROM 110 determines the amount of system memory available in the computer system 50. One conventional technique for identifying the amount of memory is to incrementally write to the system memory address space at predetermined intervals (such as every few megabytes), and read back the data written to verify that the data has been correctly written, and that there is no memory aliasing. In a computer system with several Gigabytes of system memory, this process can be very time consuming. In conventional systems, while this discovery is ongoing the BIOS software cannot proceed with initialization of other system hardware components because system initialization was done in a sequential manner, as explained in the Background of the Invention. According to the preferred embodiment, the BIOS software only needs to issue a command to the $I^2C$ controller (which preferably resides in the memory controller 100) to determine how much memory is present in the system. The $I^2C$ controller then communicates via the $I^2C$ bus 129 to $I^2C$ interfaces in each memory module in the system. Thus, the memory controller 100, operating through the $I^2C$ controller, extracts relevant information regarding the size, density, and other relevant parameters for each of the memory modules. This operation occurs independent of the BIOS software, and thus can proceed concurrently with other initialization tasks that have been started by the BIOS software on other bus structures. While the above description focuses on use of an $I^2C$ controller and $I^2C$ bus, it should be understood that the memory controller 100 may use other bus structures and protocols to determine the availability and functionality of memory modules in the system.

After the memory controller 100 has completed its interrogation of the $I^2C$ devices on each memory module, it then knows exactly how much memory exists in the system, as well as any other relevant information pertaining to the system memory, such as speed, CAS latency capability, etc. It then preferably stores this information in a table. The table preferably is comprised of a set of registers 105 located within the memory controller 100. According to the preferred embodiment, the act of storing the acquired information regarding the memory modules is done by hardware in the memory controller 100, rather than by software executing on the CPU so as not to interfere with execution of the BIOS software. If the discovery of memory resources precedes initialization of the memory, the interrupt vectors, which typically are stored in volatile memory, will not have been validated. In this instance, the normal interrupt vector system cannot be used to alert the CPU 130 that the memory controller 100 has completed its memory discovery phase. As an alternative, the memory controller 100 may use a System Management Interrupt (SMI) to notify the CPU that the memory discovery phase has completed. Alternatively, the boot CPU or CPUs may periodically poll the register 105 to determine the status of the memory discovery and/or initialization process.

Figure 4:
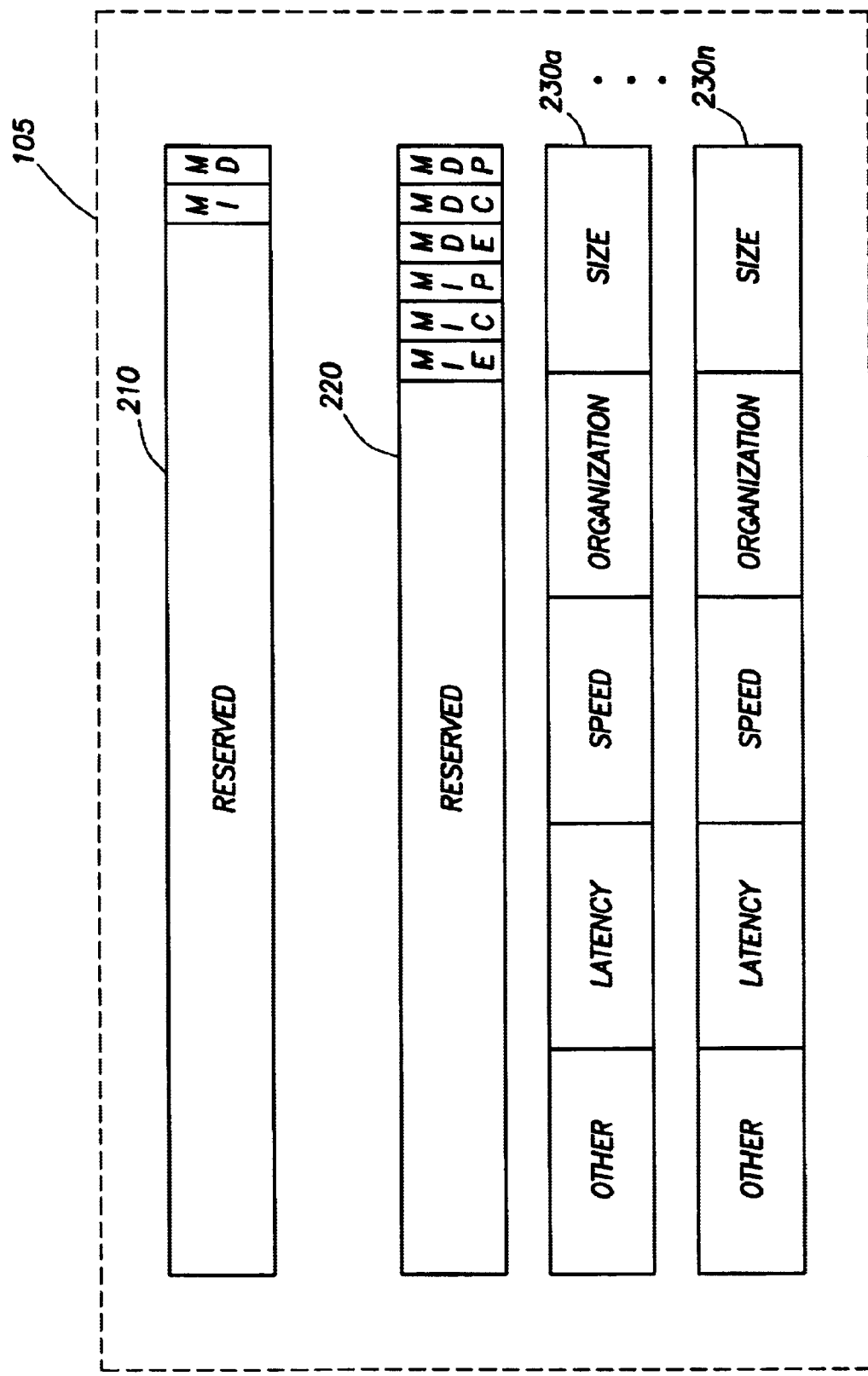
FIG. 4 is an illustration of the memory controller register of FIG. 3.

According to the preferred embodiment, and as shown in FIG. 4, the set of registers 105 preferably includes a hardware assist control register 210, a hardware assist status register 220, and configuration registers 230a–230n. Each configuration register 230a–230n is associated with a particular memory module a–n, and includes fields specifying the size, organization, speed, and latency of the memory module. The preferred implementation of each of these registers and the preferred bit structure will now be described, with the understanding that other bit configurations may be used without departing from the principles of the present invention.

Referring still to FIG. 4, the hardware assist control register 210 preferably comprises a 32-bit register, with bits 0 and 1 dedicated to providing instructions to the memory controller 100. The other bits (2:31) are not relevant to this invention, and thus are not discussed herein. Bit 0, which is the memory discovery (MD) bit, preferably comprises a read/write bit. During the boot process, or as otherwise required, the BIOS software executing on CPU 130 issues a write cycle to the MD bit, causing this bit to be set to a binary "1". Setting the MD bit causes the memory controller 100 to respond by interrogating all of the memory modules that couple to the memory controller. This interrogation preferably occurs via an I$^2$C bus or other presence detect bus or line connected between the memory controller and the memory array. Alternatively, control lines on the memory bus may be used by the memory controller 100 to run the memory discovery cycles. When the memory controller completes the memory discovery cycle to all memory modules, the MD bit is reset by circuitry internal to the memory controller 100. Bit 1 preferably comprises a memory initialization (MI) bit, which also is a read/write bit. During the boot process, the BIOS software also causes the MI bit to be set, either concurrently with setting the MD bit, or at some time thereafter. Setting the MI bit will cause the memory controller 100 to begin initializing all of the memory modules in its memory structure. This initialization occurs without further involvement of the CPU 130, via the bus that interfaces the memory controller to the memory array, such as the memory bus or some other dedicated bus. If the MD bit is set at the same time as the MI bit, then the memory controller 100 preferably executes the memory discovery phase first, followed by the memory initialization phase.

The hardware assist status register 220 also preferably comprises a 32-bit register, with bits 0–5 dedicated to indicating the status of the discovery phase and initialization phase. Bits 0–5 preferably are read only bits, which can only be read by the CPU 130. The memory controller 100 thus performs the function of setting and resetting bits 0–5. According to the preferred embodiment, bit 0 comprises the memory discovery progress bit (MDP). The MDP bit is set to a binary "1" value to indicate that the memory discovery process is in progress. A binary "0" value indicates that the memory discovery process is not in progress. Bit 1 preferably comprises the memory discovery completion (MDC) bit. The MDC bit preferably is set to a binary "1" value when memory discovery is completed, and left at a value of "0" if memory discovery is not completed. Bit 2 preferably represents the memory discovery error (MDE) bit. The MDE bit is set to a value of "1" if an error occurred during the memory discovery phase. If no error was detected during the memory discovery phase, the value of the MDE bit remains at "0". Bit 3 preferably comprises a memory initialization progress (MIP) bit, which indicates the status of memory initialization. The MIP bit is set if memory initialization is in progress. Similarly, bit 4 represents the memory initialization completion (MIC) bit. The MIC bit is set when initialization is complete. Bit 5 preferably comprises a memory initialization error (MIE) bit. This bit is set if an error occurs during the memory initialization phase. The remaining bits in register 220 are not relevant to the present invention, and thus are not discussed.

Registers 230a–230n are configuration registers that indicate the parameters of each memory module coupled to the memory controller. Preferably, each memory module has its own associated configuration register 230. Thus, for example, memory module a has an associated configuration register 230a. In similar fashion, memory module b has an associated memory configuration register 230b in register set 105. Thus, in the preferred embodiment, there is an equal number n of memory configuration registers and memory modules. Each configuration register preferably includes fields that can be written to by the memory controller to identify the parameters of the associated memory module. As shown in FIG. 4, those fields include the size of the memory module (in terms of the available storage capacity), the organization of the memory module (whether the memory is interleaved or not, etc.), the speed of the memory module, the latency of the memory module (the number of clock cycles it takes the memory to respond to a read request at the present clock settings), and any other desired information. The number of bits required for these fields may vary, and the particular operational codes that are used to represent these parameters may also vary.

In this fashion, the memory controller 100 assumes responsibility for conducting the memory discovery and memory initialization processes, thereby relieving the CPU of this task, and permitting concurrent operation with other discovery and initialization cycles executing on other distributed controllers in the system.

In similar fashion, other control devices are provided in the computer system 50 to assist in performing portions of the POST sequence. Thus, referring again to FIG. 3, the memory controller 100 preferably couples via a video bus 142 to a video controller 140. According to normal convention, the video bus 142 comprises an AGP port that couples an AGP video controller to the memory controller 100. As one skilled in the art will understand, graphics processors or accelerators implementing other protocols also may be used instead of an AGP controller. Typically, a video monitor 145 and other associated video circuitry couples to the video controller 140 via conventional bus structures. In addition, a dedicated bus may be provided that can be used as part of the discovery and/or initialization process. The video controller preferably includes register set 143, which includes a hardware assist control register, a hardware assist status register, and configuration registers, in much the same fashion as that illustrated in FIG. 4 for the memory controller register set. During the boot process, the BIOS software preferably issues one or more commands to the video controller that are written to a hardware assist control register, causing the video controller to perform discovery and initialization of the video hardware. The status of the discovery and initialization cycles is recorded in the hardware status register by the video controller, which then can be read by the CPU. Other configuration information regarding the video system, such as the size of the memory buffer, the refresh rate, and the like, may be encoded in the configuration registers, for reading by the CPU.

Referring still to FIG. 3, the memory controller 100 also preferably functions as an interface to a system bus 155. In the preferred embodiment, the system bus 155 comprises a high-speed data bus to the I/O controller hub 150. The I/O controller hub 150 bridges the system bus to a variety of peripheral busses, including a USB bus (not shown), an IDE bus 175, and a PCI bus 185. Coupled to each of these busses are ports or slots that enable compatible devices to be connected to the computer system. Thus, for example, a PCI peripheral device 187, such as a PCI-compatible network interface card (or NIC) may be inserted into one of the PCI slots, for coupling to the I/O controller 150 via the PCI bus 185. To support legacy ISA devices, a PCI-to-ISA bridge 190 preferably couples to the PCI bus 185. A conventional ISA bus 195 couples ISA slots to the PCI-to-ISA bridge 190, thereby supporting one or more ISA peripheral devices 197. Other devices, such as a modem, audio amplifier, or LAN connection may connect directly to the I/O controller hub 150, or may couple via the conventional peripheral busses.

In accordance with the preferred embodiment, the I/O controller 150 preferably includes a control logic that couples to CMOS memory in the peripheral devices that may be included in the computer system. According to the preferred embodiment, the I/O controller 150 preferably performs discovery and initialization of all peripheral devices, although this functionality may be included elsewhere in the system if desired. The I/O controller may communicate with the peripheral devices via conventional bus structures, such as the PCI bus 185, or may couple via a dedicate bus structure to the peripheral devices. Preferably the I/O controller 150 uses a bus structure that is not being used by the CPU 130 or any other controller during this portion of BIOS execution. The I/O controller 150 preferably includes a register set 152 for providing control information to the I/O controller 150 and status information to the CPU 130. Thus, register set 152 preferably includes a hardware assist control register, a hardware assist status register, and configuration registers. The hardware assist control register includes bits that are set by the CPU to initiate discovery and initialization of the peripheral devices. The hardware assist status register includes bits that indicate the status of the discovery and initialization cycles. The configuration registers preferably consist of a register associated with each peripheral device (or slot), which reflects configuration information and other operational parameters of the peripheral device.

Referring still to FIG. 3, the I/O controller 150 preferably couples to an IDE bus 175, to which various storage drives may be connected, including a hard drive 162 and a CD-ROM (and/or DVD-ROM) drive 167. According to the preferred embodiment, a hard drive controller 160 interfaces with the hard drive 162, and a CD-ROM controller 165 interfaces with CD-ROM drive 167. Each of these controllers and its associated drive may exist in the same hardware component, or may be packaged separately. According to the preferred embodiment, the hard drive controller 160 performs the function of discovering and/or initializing the hard drive 162, while the CD-ROM controller 165 discovers and/or initializes CD-ROM drive 167, in a manner similar to that disclosed above for the memory controller 100, video controller 140, and I/O controller 150. Thus, hard drive controller 160 preferably includes a register set 163 and CD-ROM controller 165 preferably includes register set 168. Register sets 163, 168 preferably include a hardware assist control register, a hardware assist status register, and a configuration register, each of which perform the same general functions as the register sets identified above for the memory controller, video controller and I/O controller.

The I/O controller may also couple to a SCSI controller 157 via a conventional bus structure or a dedicated bus. The SCSI controller 157 interfaces with one or more SCSI devices 159 through a SCSI bus 158. The SCSI controller 157 preferably coordinates discovery and initialization of the SCSI devices upon command from the CPU during execution of the BIOS software. The SCSI controller 157 preferably includes register set 161 that includes a hardware assist control register, a hardware assist status register, and one or more configuration registers.

Referring still to FIG. 3, the I/O controller hub 150 preferably couples to a Super I/O controller 250 through an I/O bus 260. The Super I/O device 250 preferably includes conventional serial and parallel ports for coupling to various peripheral devices. In addition, the Super I/O controller 250 also couples to floppy disk drives, a keyboard, and a mouse. Thus, the Super I/O device 250 preferably includes or couples to a keyboard controller 280 and to a floppy controller 270. The keyboard controller 280 couples to a keyboard and mouse 285, in conventional fashion. Similarly, floppy controller 270 couples to floppy drive 275.

The floppy controller 270 performs the function of discovering and/or initializing the floppy drive 275 upon command from the CPU 130. Similarly, the keyboard controller 280 discovers and/or initializes the keyboard and mouse 285. The floppy controller 270 and the keyboard controller 280 preferably include register sets 273, 283, which include a hardware assist control register, a hardware assist status register, and a configuration register. When initiated by the CPU 130, floppy controller 270 and keyboard controller 280 perform the discovery and/or initialization of their associated devices, and report status information back to the CPU via the status control register and the configuration register.

Although not shown in FIG. 3, it should be noted that additional bus structures may be provided to optimize the discovery and initialization process. Thus, additional I$^2$C busses or other dedicated busses may be provided point-to-point between controllers and their associated drives or peripheral devices. Similarly, the CPU 130 may couple to the controllers via special bus structures, such as one or more I$^2$C busses. In addition, the CPU 130 may issue a broadcast command to all controllers to write the command initiating testing and initialization of the various system hardware components to the hardware assist control register of each controller.

The above discussion is meant to be illustrative of the principles and various embodiments of the present invention. Numerous variations and modifications will become apparent to those skilled in the art once the above disclosure is fully appreciated. For example, the preferred embodiment described above envisions that the processor will execute BIOS software during system initialization. One skilled in the art will understand that processors may be developed that will not support BIOS software, and instead system initialization software may be executed instead. The present invention is intended to cover such processors, to the extent they operate in accordance with the principles set forth herein, even though they do not execute BIOS software. It is intended that the following claims be interpreted to embrace all such variations and modifications.

What is claimed is:

1. A computer system, comprising:
   at least one CPU that executes system software to perform computer system initialization;
   at least a first controller coupled to said CPU and a second controller coupled to the CPU;
   a first system device coupled to the first controller and a second system device coupled to the second controller; and
   wherein said CPU initiates a command to said first controller instructing said first controller to perform testing of said first system device as part of the execution of said computer system initialization, and said first controller, in response, performs testing of the first system device; and
   wherein said CPU, as part of executing the system software, also initiates a command to said second controller instructing said second controller to perform testing of said second system device, and said second controller, in response, performs testing of the second system device.

2. The system of claim 1, wherein said controllers include a register to which said CPU writes to instruct each controller to perform testing of the system device coupled to that controller.

3. The system of claim 1, wherein said controllers include a register which includes status information relating to the testing of the system device coupled to that controller, and wherein said CPU is capable of reading said register.

4. The system of claim 1, wherein the CPU also instructs the controllers to initialize the system device coupled to each controller, and in response, the controllers run initialization cycles to the system device coupled to that controller.

5. The system of claim 4, wherein said CPU simultaneously issues a command to the controllers to test and initialize said system device coupled to the controllers.

6. The system of claim 1, wherein the testing of said system devices by the first controller and the second controller occurs concurrently.

7. The system of claim 1, wherein at least one of the first and second controllers comprises any one of: a memory controller, a video controller, a hard drive controller, a CD-ROM controller, a SCSI controller, a floppy controller, or a keyboard controller.

8. The system of claim 1, wherein a least one controller comprises a memory controller that couples via a dedicated serial bus to one or more memory modules, and said memory controller performs testing and initialization of the one or more memory modules when commanded by said CPU.

9. A computer system that runs a boot cycle when power is turned on, or when the system is reset, said computer system comprising:
   at least one CPU that executes system initialization software during system initialization;
   a first controller coupled to said CPU;
   a system device coupled to said first controller via a first bus;
   a second controller coupled to said CPU;
   a second system device coupled to said second controller via a second bus;
   wherein said CPU, as part of executing the system initialization software, initiates a command to said first controller instructing said first controller to perform testing of said first system device, and said first controller, in response, performs testing of the first system device and provides a signal to said CPU indicating the status of said testing; and
   wherein said CPU, as part of executing the system initialization software, also initiates a command to said second controller instructing said second controller to perform testing of said second system device, and said second controller, in response, performs testing of the second system device and provides a signal to said CPU indicating the status of said testing.

10. The system of claim 9, wherein the command to said first controller and the command to said second controller are issued as a broadcast command.

11. The system of claim 9, wherein the testing of said first system device by the first controller and the testing of said second system device by the second controller occurs concurrently.

12. The system of claim 10, wherein the CPU also instructs the first controller to initialize the first system device, and in response, the controller runs initialization cycles to the system device.

13. The system of claim 12, wherein the CPU also instructs the second controller to initialize the second system device, and in response, the controller runs initialization cycles to the second system device.

14. A computer system that runs a boot cycle when power is turned on or when the system is reset, said computer system comprising:
   at least one CPU that executes system initialization software;
   a first controller coupled to said CPU;
   a system device coupled to said controller via a first bus;
   a second controller coupled to said CPU;
   a second system device, coupled to said controller via a second bus;
   wherein said CPU, as part of executing the system initialization software, initiates a command to said first controller instructing said first controller to initialize said first system device, and said first controller, in response, initializes said first system device and provides a signal to said CPU indicating the status of said initialization; and
   wherein said CPU, as part of executing the system initialization software, also initiates a command to said second controller instructing said second controller to initialize said second system device, and said second controller, in response, initializes the second system device and provides a signal to said CPU indicating the status of said initialization.

15. The system of claim 14, wherein the command to said first controller and the command to said second controller are issued as a broadcast command.

16. The system of claim 14, wherein the initialization of said first system device by the first controller and the initialization of said second system device by the second controller occurs concurrently.

17. A computer system that is initialized when power is turned on or when the system is reset, said computer system comprising:
   at least one CPU that executes system initialization software;
   a memory controller coupled to said CPU;

at least one memory module coupled to said memory controller;

a second controller coupled to said CPU;

a second system device coupled to said controller via a second bus;

wherein said CPU, as part of executing the system initialization software; initiates a command to said memory controller instructing said memory controller to initiate discovery of said memory module, and said memory controller, in response, interrogates said memory module and provides a signal to said CPU indicating the status of said discovery; and wherein said CPU, as part of executing the basic input/output system software, also initiates a command to said second controller instructing said second controller to test said second system device, and said second controller, in response, tests the second system device and provides a signal to said CPU indicating the status of said test.

18. The system of claim 17, wherein the second controller comprises any one of: a video controller, a hard drive controller, a CD-ROM controller, a SCSI controller, a floppy controller, an I/O controller, or a keyboard controller.

19. The system of claim 17, wherein the command to said memory controller and the command to said second controller are issued as a broadcast command.

20. The system of claim 17, wherein the discovery of the memory module by the memory controller and the testing of said second system device by the second controller overlaps in time.

21. A method of performing system initialization in a computer system, comprising the acts of:

transmitting a command from a CPU to a first controller to initiate a test cycle for a first system resource;

transmitting a command from the CPU to a second controller to initiate a test cycle for a second system resource;

performing a test cycle to the first system resource without the involvement of the CPU;

performing a test cycle to the second system resource without the involvement at the CPU, with the test cycle to the second system resource overlapping in time with the test cycle to the first system resource; and reporting the status of the test cycles to the CPU.

22. A method as in claim 21, wherein the act of reporting the status of the test cycle to the first system resource includes the act of writing to dedicated bits in a status register in said first controller, and wherein said CPU reads said dedicated bits as part of the boot cycle.

23. A method as in claim 21, wherein the act of reporting the status of the test cycle to the second system resource includes the act of writing to dedicated bits in a status register in said second controller, and wherein said CPU reads said dedicated bits as part of the system initialization.

24. A method as in claim 21, wherein the CPU also commands the first controller to initialize the first system resource and the second controller to initialize the second system resource, and wherein the initialization of the first system resource and the second system resource overlap in time.

25. A method as in claim 21, wherein the first controller comprises a memory controller, and the first system resource comprises system memory.

26. A method as in claim 25, wherein the second controller comprises one of: a video controller, a CD-ROM controller, a hard drive controller; an I/O controller, a SCSI controller, a keyboard controller, or a floppy drive controller.

27. A method of executing a boot cycle in a computer system, comprising the acts of:

during initialization of the computer system, transmitting a command from a CPU to a first controller to initiate a test cycle for a first system resource;

during initialization of the computer system, performing a test cycle to the first system resource without the involvement of the CPU;

during initialization of the computer system, reporting the status of the test cycle to the CPU; and during initialization of the computer system, transmitting a command from the CPU to a second controller to initiate a test cycle for a second system resource.

28. A method as in claim 27, further comprising the acts of:

transmitting a command from the CPU to the first controller to initiate initialization of the first system resource;

performing an initialization cycle to the first system resource without the involvement of the CPU; and reporting the status of the initialization cycle to the CPU.

29. A method as in claim 28, further comprising the acts of:

writing configuration information regarding the first system resource to a configuration register than can be read by the CPU.

30. A method as in claim 27, wherein the act of reporting the status of the test cycle to the first system resource includes the act of writing to dedicated bits in a status register in said first controller, and wherein said CPU reads said dedicated bits as part of executing a basic input/output system software during the boot cycle.

31. A method as in claim 27, wherein the act of transmitting a command from the CPU to the first controller includes the act of setting a bit of a control register in the first controller, which is read by the first controller and used to launch the test cycle to the first system resource.

32. A method as in claim 28, wherein the act of transmitting a command from the CPU to the first controller to initiate initialization of the first system resource includes the act of setting a bit of a control register in the first controller, which is read by the first controller and used to launch the test cycle to the first system resource.

33. A method as in claim 27, wherein at least one of the first and second controllers comprises a memory controller, and at least one of the first and second system resources comprises system memory.

34. A method as in claim 27, wherein at least one of the first and second controller comprises one of: a memory controller; a video controller, a CD-ROM controller, a hard drive controller; an I/O controller, a SCSI controller, a keyboard controller, or a floppy drive controller.

35. The computer system of claim 1 wherein said controllers also provides a signal to said CPU indicating the status of said testing.

36. The computer system of claim 1 wherein said first controller provides a signal to said CPU indicating the status of said testing of said first system device and said second controller also provides a signal to said CPU indicating the status of the testing of the second system device.

* * * * *

UNITED STATES PATENT AND TRADEMARK OFFICE
CERTIFICATE OF CORRECTION

| | |
|---|---|
| PATENT NO. | : 6,886,109 B2 |
| APPLICATION NO. | : 09/860266 |
| DATED | : April 26, 2005 |
| INVENTOR(S) | : Sompong P. Olarig et al. |

It is certified that error appears in the above-identified patent and that said Letters Patent is hereby corrected as shown below:

Claim 8, Column 11, line 51, after "wherein" delete "a" and insert therefor --at--

Claim 17, Column 13, line 7, after "software" delete ";" and insert therefor --,--

Signed and Sealed this

Twenty-eighth Day of July, 2009

JOHN DOLL
*Acting Director of the United States Patent and Trademark Office*